US011059705B2

(12) United States Patent
Minamidate

(10) Patent No.: US 11,059,705 B2
(45) Date of Patent: Jul. 13, 2021

(54) ELECTRIC HOISTING MACHINE

(71) Applicant: KITO CORPORATION, Yamanashi (JP)

(72) Inventor: Hidenori Minamidate, Yamanashi (JP)

(73) Assignee: KITO CORPORATION, Yamanashi (JP)

(*) Notice: Subject to any disclaimer, the term of this patent is extended or adjusted under 35 U.S.C. 154(b) by 114 days.

(21) Appl. No.: 16/493,834

(22) PCT Filed: Dec. 28, 2017

(86) PCT No.: PCT/JP2017/047185
§ 371 (c)(1),
(2) Date: Sep. 13, 2019

(87) PCT Pub. No.: WO2018/168161
PCT Pub. Date: Sep. 20, 2018

(65) Prior Publication Data
US 2020/0087124 A1 Mar. 19, 2020

(30) Foreign Application Priority Data
Mar. 17, 2017 (JP) .............................. JP2017-053240

(51) Int. Cl.
*B66D 3/20* (2006.01)
*H02K 11/30* (2016.01)
(Continued)

(52) U.S. Cl.
CPC ................ *B66D 3/20* (2013.01); *B66D 1/46* (2013.01); *H02K 11/30* (2016.01); *H02K 17/08* (2013.01); *H02P 1/44* (2013.01); *H02K 5/22* (2013.01)

(58) Field of Classification Search
CPC .... H02K 11/20; H02K 11/0094; H02K 11/30; H02K 11/33; H02K 5/22; H02K 17/08;
(Continued)

(56) References Cited

U.S. PATENT DOCUMENTS 5,796,234 A * 8/1998 Vrionis ..................... H02P 1/42
318/700
6,215,214 B1 * 4/2001 Fisher ........................ H02K 5/04
310/85
(Continued)

FOREIGN PATENT DOCUMENTS

CN 1447491 A 10/2003
CN 101636342 A 1/2010
(Continued)

OTHER PUBLICATIONS

CNIPA First Office Action for corresponding CN Application No. 201780087996.6; dated Jun. 23, 2020.
(Continued)

*Primary Examiner* — Burton S Mullins
(74) *Attorney, Agent, or Firm* — Cantor Colburn LLP

(57) ABSTRACT

This electric hoisting machine comprises: a motor driven by single-phase current; a cylindrical motor housing; a starting capacitor; a operating capacitor; a starting capacitor disconnecting switch; a control unit which controls the operation of the motor and which is covered by a control housing; and a housing case in which small-diameter cylindrical portions for accommodating the starting capacitor, a large-diameter cylindrical portion for accommodating the operating capacitor, and a large-diameter cylindrical portion for accommodating the starting capacitor disconnecting switch are integrally provided in a state of continuing in a horizontal row, the housing case being mounted on the outer periphery of the
(Continued)

motor housing in such a manner that the cylindrical portions are oriented parallel to a rotation axis.

7 Claims, 12 Drawing Sheets

(51) Int. Cl.
*H02K 5/22* (2006.01)
*H02K 17/08* (2006.01)
*B66D 1/46* (2006.01)
*H02P 1/44* (2006.01)

(58) Field of Classification Search
CPC ... B66D 3/20; H02P 1/44; H02G 2/04; H02G 2/02; H02G 4/38
USPC .......................................................... 310/89
See application file for complete search history.

(56) References Cited

U.S. PATENT DOCUMENTS

| | | | | |
|---|---|---|---|---|
| 6,229,235 B1 * | 5/2001 | Ellis | ............ | H02K 17/30 310/68 E |
| 7,102,264 B2 | 9/2006 | Yanashima et al. | | |
| 8,582,294 B2 * | 11/2013 | Guerin | ............ | H01G 11/18 361/688 |
| 10,662,036 B2 * | 5/2020 | Fretz | ............ | H02K 11/40 |
| 2007/0272904 A1 | 11/2007 | Johnston et al. | | |
| 2008/0159876 A1 * | 7/2008 | Keener | ............ | H02K 17/30 417/44.11 |
| 2016/0376028 A1 | 12/2016 | Kube | | |

FOREIGN PATENT DOCUMENTS

| | | | | |
|---|---|---|---|---|
| CN | 103339699 A | 10/2013 | | |
| CN | 106276662 A | 1/2017 | | |
| FR | 2575341 A1 * | 6/1986 | ............ | H02K 5/136 |
| JP | 5219609 U | 2/1977 | | |
| JP | H0640696 U | 5/1994 | | |
| JP | 2002295367 A | 10/2002 | | |
| JP | 2012169333 A | 9/2012 | | |

OTHER PUBLICATIONS

International Search Report corresponding to Application No. PCT/JP2017/047185; dated Feb. 27, 2018.

* cited by examiner

ELECTRIC HOISTING MACHINE

CROSS REFERENCE TO RELATED APPLICATIONS

This is a U.S. national stage of application No. PCT/JP2017/047185, filed on Dec. 28, 2017. Priority under 35 U.S.C. § 119(a) and 35 U.S.C. § 365(b) is claimed from Japanese Patent Applications No. 2017-053240 filed on Mar. 17, 2017, the disclosure of which is also incorporated herein by reference.

TECHNICAL FIELD

The present invention relates to an electric hoisting machine used for work of discharging a cargo.

BACKGROUND ART

In an electric chain block as an electric hoisting machine that moves up and down a cargo using driving force of a motor, a three-phase induction motor is generally used. However, some electric chain blocks need to use a single-phase induction motor. An example of the electric chain block using the single-phase induction motor is disclosed in PTL 1.

The electric chain block disclosed in PTL 1 includes a single-phase motor (single-phase induction motor), a starting capacitor for starting the single-phase motor (starting capacitor), and a running capacitor for starting and operating the single-phase motor (operating capacitor).

CITATION LIST

Patent Literature

{PTL 1} Japanese Patent Application Laid-Open Publication No. 06-040696

SUMMARY OF INVENTION

Technical Problem

Incidentally, in the electric chain block disclosed in PTL 1, large current flows in the starting capacitor and the operating capacitor for the electric chain block, their sizes are also large. Accordingly, when the starting capacitor and the operating capacitor are attached to the electric chain block, its size comes to be large. In other words, the electric chain block using the single-phase induction motor has a problem of size becoming large according to an amount of the starting capacitor and the operating capacitor which are attached thereto even if the size of the single-phase induction motor is the same as that of the three-phase induction motor.

Further, when the required torque is large at start of the single-phase induction motor, a large capacitance starting capacitor is required.

The present invention has been made in consideration of the above circumstances, and its object is to provide an electric hoisting machine capable of achieving, at least, prevention of an increase in size even in the case of attaching a starting capacitor and an operating capacitor thereto, or prevention of an increase in man-hours for attaching the starting capacitor and the operating capacitor.

Solution to Problem

In order to solve the above problem, according to a first aspect of the present invention, there is provided an electric hoisting machine including: a motor provided at a main body of the electric hoisting machine, the motor being driven by single-phase current, and including a main winding and an auxiliary winding; a motor housing provided in a cylindrical shape on an outer peripheral side of the motor; a starting capacitor electrically connected in series with the auxiliary winding of the motor; an operating capacitor electrically connected in series with the auxiliary winding of the motor, and electrically connected in parallel with the starting capacitor; a starting capacitor disconnecting switch for disconnecting the electrical connection between the auxiliary winding and the starting capacitor or the electrical connection between the starting capacitor and the single-phase current, after start of the motor; a control unit controlling an operation of the motor and covered with a control housing; and a housing case in which a first cylindrical portion for accommodating the starting capacitor, a second cylindrical portion for accommodating the operating capacitor, and a third cylindrical portion for accommodating the starting capacitor disconnecting switch are integrally provided in a state of continuing in a horizontal row, the housing case being attached to an outer periphery of the motor housing in a manner that the cylindrical portions are oriented parallel with a rotation axis.

Further, in another aspect of the present invention, it is preferable in the above-described invention that the first cylindrical portion is provided to be smaller in diameter than the second cylindrical portion, and the first cylindrical portion is provided between the second cylindrical portion and the third cylindrical portion.

Further, in another aspect of the present invention, it is preferable in the above-described invention that the second cylindrical portion and the third cylindrical portion protrude in a direction separating from a first outer wall surface of the control housing farther than the first cylindrical portion to prevent protrusion of the second cylindrical portion and the third cylindrical portion on the first outer wall surface side.

Further, in another aspect of the present invention, it is preferable in the above-described invention that: one or two starting capacitors are provided; and when only one starting capacitor is provided, only one first cylindrical portion is provided, and at any region of an outer peripheral wall portion constituting the first cylindrical portion, a joint part made by joining after cutting to remove one first cylindrical portion from the housing case having two first cylindrical portions is provided.

Further, in another aspect of the present invention, it is preferable in the above-described invention that: the housing case is provided with a pair of cutting guides separated from each other at a distance corresponding to removal of the two first cylindrical portions; when the two starting capacitors are provided, the starting capacitors are accommodated in the two first cylindrical portions respectively in a state of not cutting at the cutting guides; and when the only one starting capacitor is provided, the only one starting capacitor is accommodated in the only one first cylindrical portion in a state where the joint part is formed after the cutting along the cutting guides.

Advantageous Effects of Invention

In an electric hoisting machine, the present invention allows to prevent, at least, an increase in size in the case of attaching a starting capacitor and an operating capacitor to an electric hoisting machine, or an increase in man-hours for attaching the starting capacitor and the operating capacitor.

DESCRIPTION OF EMBODIMENTS

Figure 1:
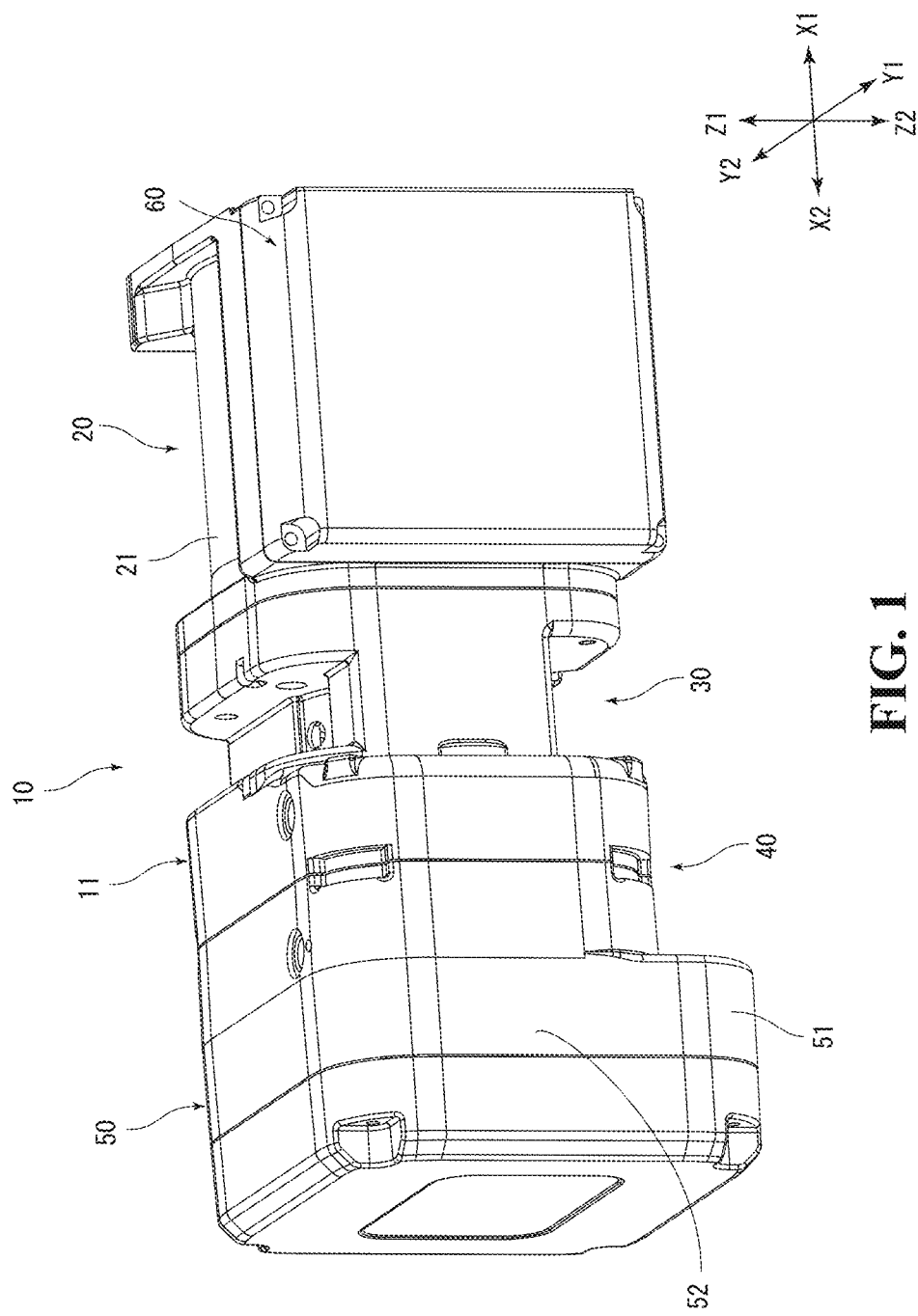
FIG. 1 is a perspective view illustrating the whole configuration of a main body of an electric chain block according to an embodiment of the present invention.

Hereinafter, an electric chain block 10 as an electric hoisting machine according to an embodiment of the present invention will be explained referring to the drawings. Note that in the following explanation, an explanation will be given using an XYZ orthogonal coordinate system as needed. An X-direction in the XYZ orthogonal coordinate system is assumed to be a longitudinal direction of a main body 11 in FIG. 1 and an axial direction of a drive shaft 23 in FIG. 3, and an X1 side indicates a right side in FIG. 1 and an X2 side indicates a left side opposite thereto. Further, a Z-direction indicates a direction in which the electric chain block 10 is suspended, and a Z1 side indicates a deep side of paper in FIG. 1 and FIG. 2 and a Z2 side indicates a near side of paper opposite thereto. Further, a Y-direction indicates a direction orthogonal to the X-direction and to the Z-direction, a Y1 side indicate an upper left side in FIG. 2 and a Y2 side indicates a lower right side opposite thereto.

The electric chain block 10 in this embodiment can be applied to a method of use for raising and lowering a load in a state where a main body is attached to an upper part (normal suspension), and additionally can be applied to a method of moving up and down the main body together with the load in a state where a hook attached to the tip of a load chain is hooked on an engaging region at an upper part (reverse suspension). The reverse suspension is preferable for a work of lifting and installing equipment for illumination and audio at a place where it is difficult to raise and attach the main body to the ceiling or the like of a stage, concert-hall, event hall or the like.

Regarding the Whole Configuration of the Electric Chain Block 10

FIG. 1 is a perspective view illustrating the whole configuration of a main body 11 of the electric chain block 10. As illustrated in FIG. 1, the electric chain block 10 includes a motor unit 20, a load sheave arrangement part 30, a reduction mechanism 40, a control unit 50, a capacitor accommodating part 60 and so on.

Figure 2:
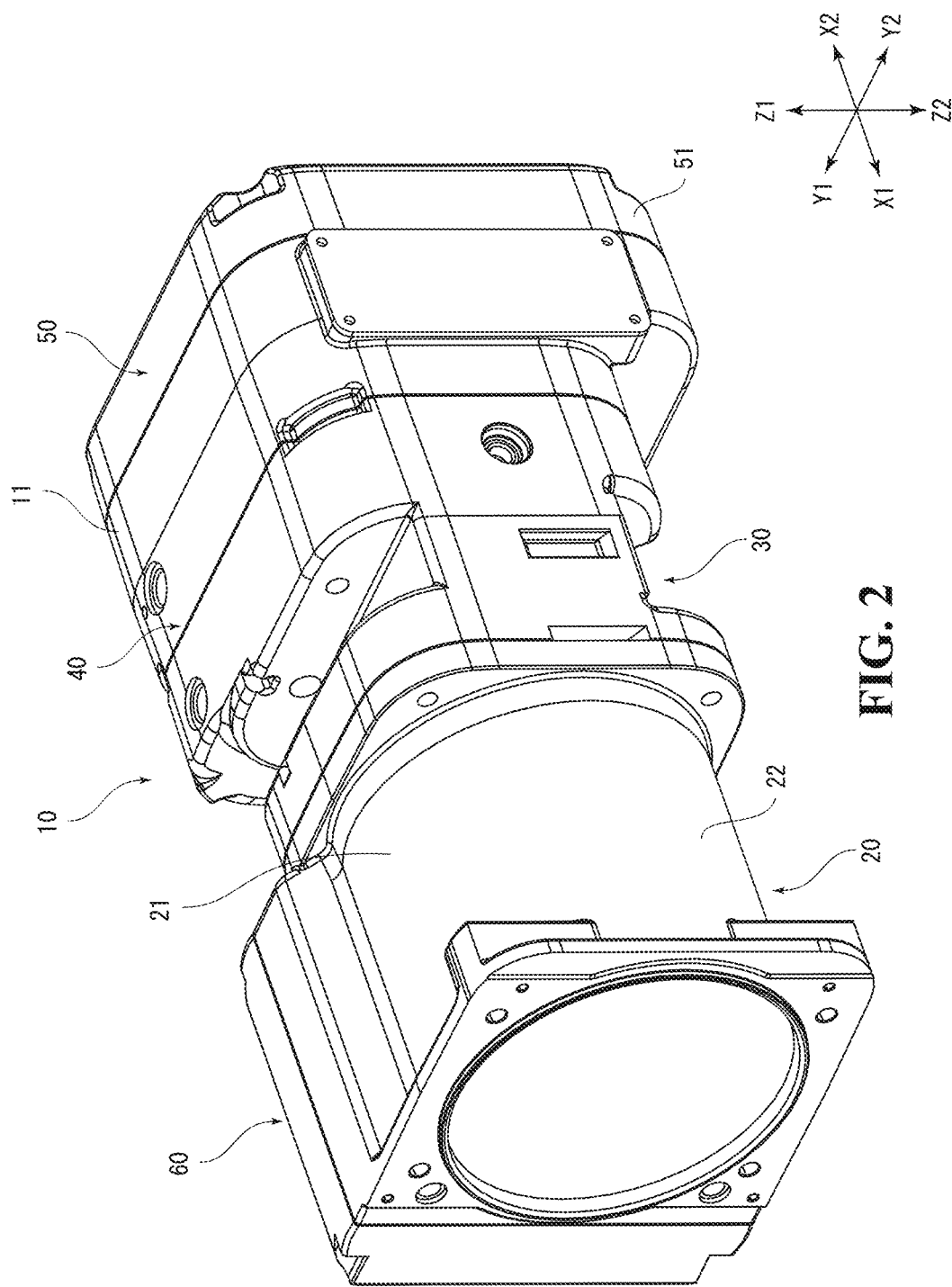
FIG. 2 is a perspective view illustrating a motor housing of the electric chain block illustrated in FIG. 1, in which a lid member is removed.

The motor unit 20 includes a motor 21. FIG. 2 is a perspective view illustrating a motor housing 22 of the motor 21 with a lid member removed therefrom. As illustrated in FIG. 2, the motor 21 is covered by the aluminum diecast motor housing 22 in a cylindrical shape, and the later-described capacitor accommodating part 60 is coupled to the cylindrical-shaped motor housing 22. In this embodiment, the motor 21 is a single-phase induction motor, and can be operated by a single-phase alternating-current power supply supplied to general household. Note that the motor housing 22 may be a part of the motor 21 (integrally with the motor 21) or may be separated from the motor 21.

Figure 3:
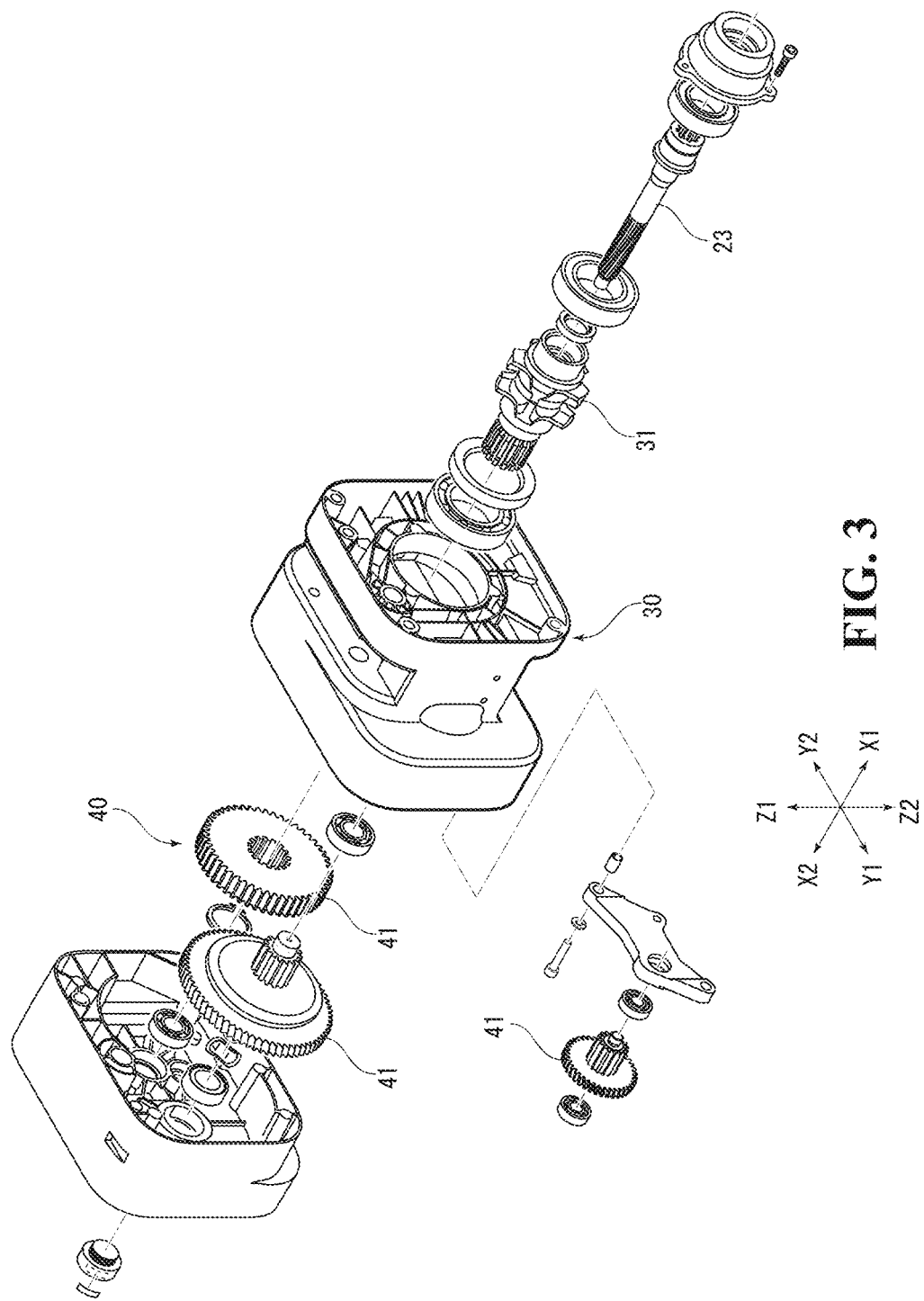
FIG. 3 is an exploded perspective view illustrating a configuration near a gear unit and a body of the electric chain block illustrated in FIG. 1.

FIG. 3 is an exploded perspective view illustrating a configuration near a gear unit and a body of the electric chain block 10 illustrated in FIG. 1. The driving force generated in the aforementioned motor 21 is transmitted via the drive shaft 23 to the reduction mechanism 40. As illustrated in FIG. 3, the reduction mechanism 40 includes a plurality of gear members 41, and the rotation of the drive shaft 23 is reduced by the gear members 41 and transmitted to a load sheave member 31.

In a load sheave arrangement part 30, the aforementioned load sheave member 31 is arranged, and around the load sheave member 31, a not-illustrated load chain is wound. By hoisting and lowering the load chain, the distance between the not-illustrated hook and the main body 11 of the electric chain block 10 is relatively changed. This can lift a load with respect to the main body 11 located above in the case of the normal suspension. Besides, the load can be lifted together with the main body 11 in the case of the reverse suspension. In the case of a winch (corresponding to the electric hoisting machine) using a rope or a belt in place of the load chain, a member suitable for hoisting and lowering a sling such as a winding drum is appropriately provided in place of the load sheave.

Further, in the electric chain block 10, the control unit 50 for controlling the drive of the motor 21 is also provided. In this embodiment, the control unit 50 is attached to a region adjacent to the reduction mechanism 40. The control unit 50 is covered by a rectangular (box-shaped) control housing 51.

Attachment of a Capacitor and a Disconnecting Switch

Figure 4:
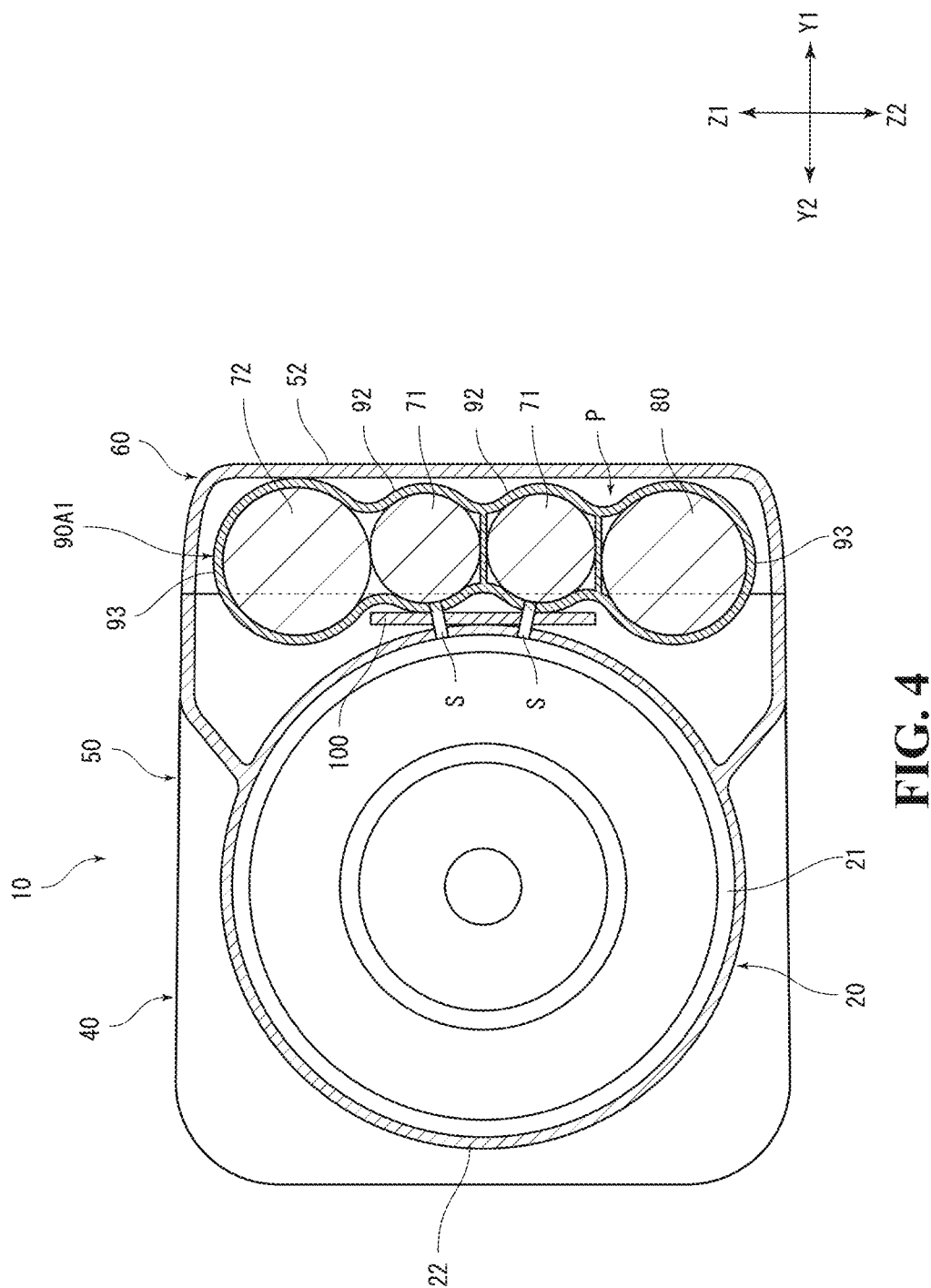
FIG. 4 is a side sectional view illustrating a configuration near a motor unit and a capacitor housing part of the electric chain block illustrated in FIG. 1.

Further, as illustrated in FIG. 1 and FIG. 2, in the electric chain block 10, the capacitor accommodating part 60 for storing capacitors 71, 72 is provided. FIG. 4 is a side sectional view illustrating the configuration near the motor unit 20 and the capacitor accommodating part 60. As illustrated in FIG. 4, in an internal space P of the capacitor accommodating part 60, the capacitors 71, 72 and a starting capacitor disconnecting switch 80 (hereinafter, called a disconnecting switch) are stored. In this embodiment, there are a starting capacitor 71 and an operating capacitor 72 as the capacitors 71, 72.

The motor 21 includes a main winding and an auxiliary winding (not illustrated), and the capacitors 71, 72 are electrically connected in parallel with each other and connected in series with the auxiliary winding of the motor 21 and further connected to the AC power supply. The auxiliary winding is supplied with phase shifted current shifted by the capacitor with respect to the phase of the current of the main winding, and thereby a rotating magnetic field is generated to control the rotation direction of the motor 21 and increase the starting torque. Note that in the case where the starting torque needs to be increased, the size of the motor 21 needs to be increased and the capacitances of the capacitors 71, 72 need to be increased, however, in this embodiment, and two starting capacitors 71 are used and electrically connected in parallel to prevent an increase of the size of the electric chain block.

Further, the operating capacitor 72 is connected in parallel with the starting capacitor 71. The operating capacitor 72 contributes to an increase in starting torque together with the starting capacitor 71 in start, and is used for improving the power factor of the motor 21 in continuous operation after the start of the motor 21 to decrease the current value. Note that the starting capacitor 71 may be the one having a low duty factor (about 5%) since the starting capacitor 71 is energized only for a short time at the start, whereas the operating capacitor 72 should have a high duty factor (continuous rating).

In this embodiment, for example, a starting capacitor of 150 μF and an operating capacitor of 55 μF are used to set the capacitor capacitance in start to 205 μF in the case of a motor 21 of 0.5 kw, and two starting capacitors 71 of 150 μF each and one operating capacitor 72 of 55 μF are used to set the capacitor capacitance in start to 355 μF in the case of a motor 21 of 1.1 kw. Further, after a lapse of a predetermined time after the start, the starting capacitor 71 is disconnected, both of the motors 21 of 0.5 kw and of 1.1 kw are operated by the one operating capacitor 72 of a capacitance of 55 μF. The common operating capacitor 72 is used for the motors 21 of 0.5 kw and of 1.1 kw. Further, also in the case of being used for the motors 21 of 0.5 kw and of 1.1 kw, the starting capacitors 71 are smaller in diameter than the operating capacitors 72. Further, the operating capacitors 72 are common in the above examples so that the number of types of capacitors 71 and 72 is not increased, which contributes to reduction in manufacturing cost. Note that the operating capacitor 72 is arranged on one end side in FIG. 4.

Further, in addition to the starting capacitors 71 and the operating capacitor 72, the disconnecting switch 80 is also accommodated in the internal space P. The disconnecting switch 80 is electrically connected in series with the starting capacitors 71. Any disconnecting switch 80 may be used as long as it disconnects the connection between the auxiliary winding and the starting capacitors 71 or the connection between the starting capacitors 71 and the single-phase alternating-current power under a predetermined condition, after the start of the motor 21. An example of such a predetermined condition for the switching from close to open is a lapse of a predetermined time after the start of the motor 21 or the motor 21 reaching a predetermined rotation speed (for example, 75% of the rated rotation speed).

Incidentally, in the recent single-phase induction motor, the starting capacitors 71, the operating capacitor 72, and the starting capacitor disconnecting switch 80 for use are relatively large in size as illustrated in FIG. 4. Accordingly, when the starting capacitors 71, the operating capacitor 72, and the disconnecting switch 80 are attached to the single-phase induction motor, the size thereof is accordingly increased.

Regarding the attachment, it is conceivable that each of the starting capacitors 71, the operating capacitor 72, and the disconnecting switch 80 is attached to a side surface of the single-phase induction motor, a side surface of the housing covering the single-phase induction motor or the like via a fixing means. In this case, many man-hours are required for fixing them.

In contrast to the above, in this embodiment, the starting capacitors 71, the operating capacitor 72, and the disconnecting switch 80 are accommodated in a housing case 90A1 as illustrated in FIG. 4. In a state where they are accommodated, the housing case 90A1 is attached to an outer peripheral side of the motor housing 22. In other words, the starting capacitors 71, the operating capacitor 72, and the disconnecting switch 80 are collectively attached to the outer peripheral side of the cylindrical-shaped motor housing 22.

Figure 5:
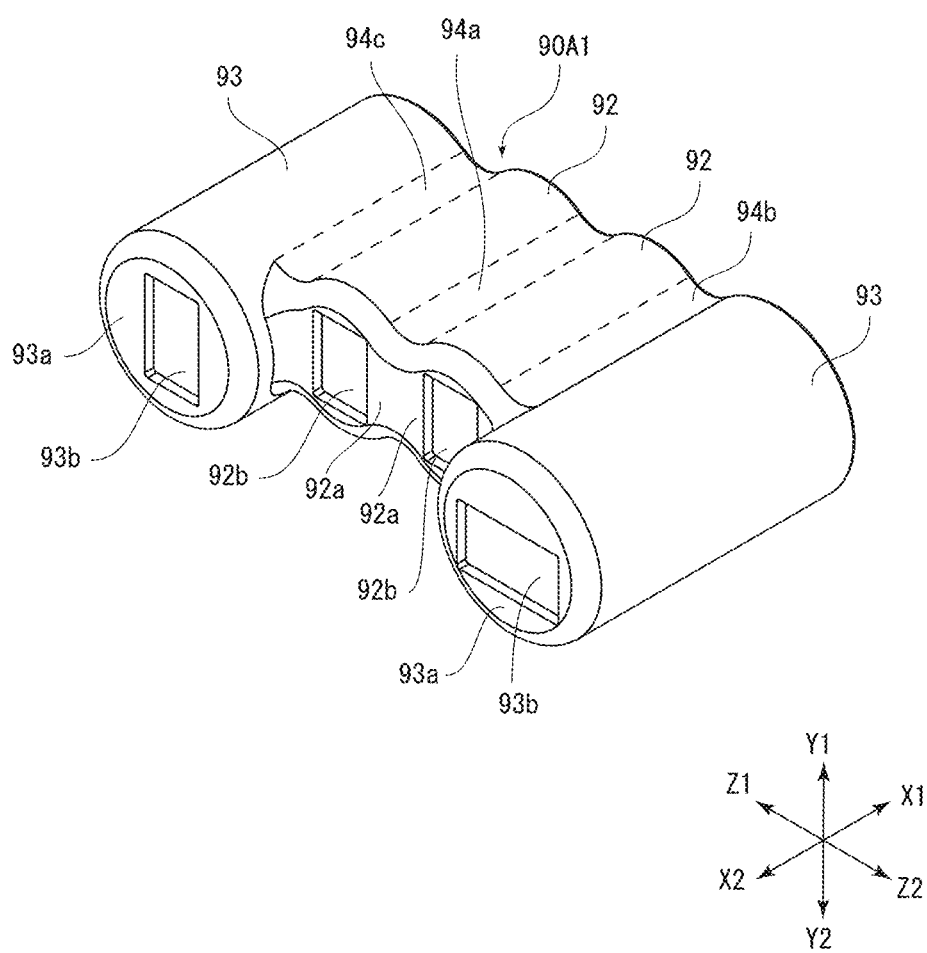
FIG. 5 is a perspective view illustrating a configuration of a housing case of the electric chain block illustrated in FIG. 1.
Figure 6:
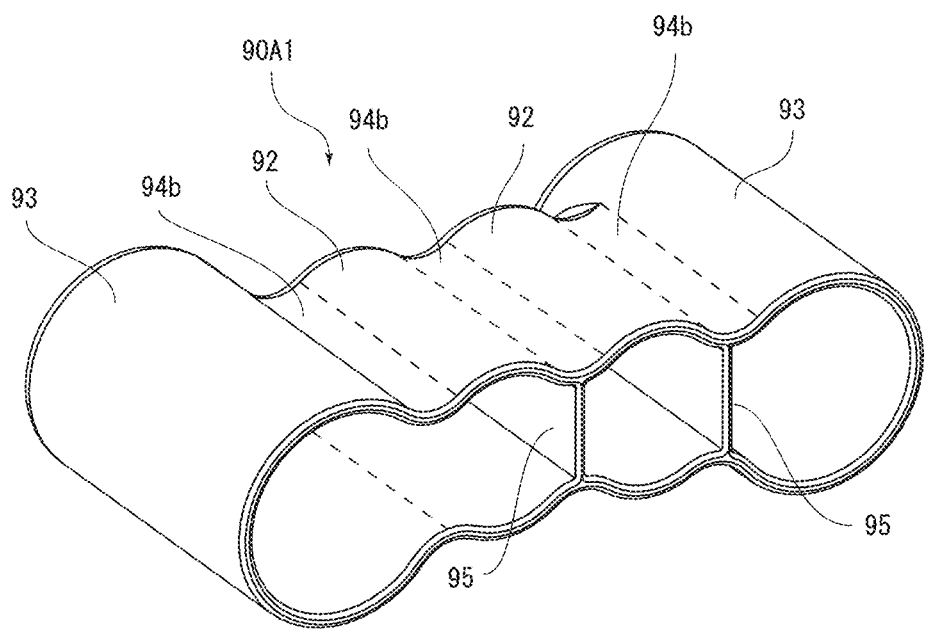
FIG. 6 is a perspective view illustrating the housing case of the electric chain block illustrated in FIG. 1, which is viewed from the side opposite to bottom portion.
Figure 6:
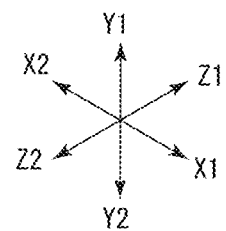

FIG. 5 is a perspective view illustrating the configuration of the housing case 90A1. FIG. 6 is a perspective view illustrating a state of the housing case 90A1 viewed from the opposite side to bottom portions 92a, 93a.

As illustrated in FIG. 5 and FIG. 6, the housing case 90A1 is provided in a form that cylindrical portions continue by an outer peripheral wall portion 91 with a predetermined thickness continuing. Further, in the cylindrical portions, the bottom portions 92a, 93a also exist in addition to the outer peripheral wall portion 91. Thus, the housing case 90A1 is provided in a form that the bottomed cylindrical portions continue.

The housing case 90A1 is provided with a pair of small-diameter cylindrical portions 92 for accommodating the starting capacitors 71 and a pair of large-diameter cylindrical portions 93 for accommodating the operating capacitor 72 and the disconnecting switch 80. In the configuration illustrated in FIG. 5 and FIG. 6, the housing case 90A1 is configured such that four cylindrical portions composed of the small-diameter cylindrical portions 92 and large-diameter cylindrical portions 93 are consecutively arranged side by side. Note that as is clear from FIG. 5 and FIG. 6, the small-diameter cylindrical portion 92 is smaller in diameter than the large-diameter cylindrical portion 93. Further, the small-diameter cylindrical portion 92 is smaller in length than the large-diameter cylindrical portion 93. However, the small-diameter cylindrical portion 92 and the large-diameter cylindrical portion 93 may be equal in length.

Note that the pair of small-diameter cylindrical portions 92 correspond to a first cylindrical portions. Further, any one of the pair of large-diameter cylindrical portions 93 corresponds to a second cylindrical portion and any other of them corresponds to a third cylindrical portion.

Besides, the housing case 90A1 is formed of an easily deformable material. Examples of the material include elastomer such as natural or synthetic rubber, and in the case of using the elastomer, the housing case 90A1 is excellent also in insulation performance. Further, when using elastomer as a material, the housing case 90A1 can also exhibit the effect of vibration absorption and sound isolation. However, when the positions of the bottom portions are made to have a level difference as in FIG. 5 and FIG. 6, a wiring space for the capacitors can be provided larger by an amount corresponding to the level difference, thus facilitating a wiring work in a preferable form.

Further, the housing case 90A1 in which the four cylindrical portions are arranged side by side is configured as follows. Specifically, as illustrated in FIG. 5 and FIG. 6, the pair of small-diameter cylindrical portions 92 are arranged at positions sandwiched between the two large-diameter cylindrical portions 93. Accordingly, a recessed portion 94a exists between the pair of small-diameter cylindrical portions 92, and recessed portions 94b, 94c are provided between the small-diameter cylindrical portions 92 and the large-diameter cylindrical portions 93 respectively. The existence of the recessed portions 94a to 94c enables positioning of the starting capacitors 71, the operating capacitor 72, and the disconnecting switch 80 which are to be accommodated in the housing case 90A1.

Further, as illustrated in FIG. 4 and FIG. 6, the housing case 90A1 is further provided with partition walls 95. The partition walls 95 are provided to surround, for example, a specific small-diameter cylindrical portion 92. This can improve the positioning performance of the starting capacitors 71 and so on. However, the partition wall 95 may be configured to exist between the pair of small-diameter cylindrical portions 92.

The bottom portion 92a of each of the small-diameter cylindrical portions 92 is provided with a window portion 92b for allowing the wiring and terminal for connection to pass therethrough. Similarly, the bottom portion 93a of each of the large-diameter cylindrical portions 93 is provided with a window portion 93b for allowing the wiring and terminal for connection to pass therethrough. In the configuration illustrated in FIG. 5, the window portion 92b has a shape in which the bottom 92 a is cut into a rectangular shape. Further, the window portion 93b is also has a shape in which the bottom 92 a is cut into a rectangular shape. However, the bottom portions 92a, 93a may have a shape other than the rectangular shape. Further, the window portions 92b, 93b of the small-diameter cylindrical portion 92 and the large-diameter cylindrical portion 93 may not be separated from each other.

In the attachment of the housing case 90A1, the housing case 90A1 is fixed to the motor housing 22 using a fixing plate 100 (metal plate, resin plate or the like) as illustrated in FIG. 4. In this case, the housing case 90A1 and the fixing plate 100 may be fixed to the motor housing 22 using fastening means S such as a screw, a nut or the like. In this case, the fastening means S may be configured to reach the housing case 90A1 while penetrating the fixing plate 100.

Further, for example, the fixing plate 100 may be fixed to the motor housing 22 via a screw or the like and the housing case 90A1 may be fixed to the fixing plate 100 via a binding band. In this case, it is preferable that the binding band is located at at least two of the aforementioned recessed portions 94a to 94c (preferably including the recessed portion 94b and the recessed portion 94b) and fastened to the fixing plate 100.

Here, when the housing case 90A1 in which the starting capacitors 71, the operating capacitor 72, and the disconnecting switch 80 are accommodated is attached to the motor housing 22 via the fixing plate 100, their positional relation is as illustrated in FIG. 4. Specifically, a region on the motor housing 22 side (the Y2 side) of the housing case 90A1 can be made to follow the arc shape of the motor housing 22. Accordingly, the large-diameter cylindrical portions 93 of the housing case 90A1 can be brought into a state of protruding farther to the other side (the Y2 side) in a width direction (the Y-direction) than the small-diameter cylindrical portions 92.

On the other hand, the electric chain block 10 is demanded to be reduced in space. Under such a demand, the capacitor accommodating part 60 is difficult to be protruded farther to one side in the width direction (the Y-direction) than the control unit 50. In particular, in the electric chain block using the recent three-phase induction motor, a first outer wall surface 52 of the control housing 51 of the control unit 50 is at the position most protruding to the one side (the Y1 side) in the width direction (the Y-direction). Accordingly, in consideration of the housing property and the like of the electric chain block 10 not in use, the capacitor accommodating part 60 is desirably configured to protrude to the one side (the Y1 side) in the width direction (Y-direction) at the same level as that of the first outer wall surface 52 or not to protrude to the one side (the Y1 side) in the width direction (the Y-direction) less than the first outer wall surface 52.

In consideration of the above point, the capacitor accommodating part 60 has a dimension of protrusion to the one side (the Y1 side) in the width direction (Y-direction) set to be the level same as or lower than the first outer wall surface 52 of the control unit 50. This keeps the excellent storage property without impairing the storage property of the electric chain block 10 not in use. Note that the first outer wall surface 52 of the control housing 51, where the first outer wall surface 52 is a portion of the control housing 51, is an outer peripheral wall located on the same side (the Y1 side) as the housing case 90A1 with respect to the drive shaft 23 of the motor 21 as illustrated in FIG. 1 and FIG. 4.

Regarding Production of the Housing Case Having Three Consecutive Cylindrical Portions Further, the electric chain block 10 in this embodiment includes a case where only one starting capacitor 71 is used. In this case, it is preferable to use a housing case 90B1 having three consecutive cylindrical portions. More specifically, the housing case 90A1 having four consecutive cylindrical portions illustrated in FIG. 4 to FIG. 6 is large in terms of size, thereby causing an increase in size of the electric chain block 10.

On the other hand, when the housing case 90A1 having the four consecutive cylindrical portions and the housing case 90B1 having the three consecutive cylindrical portions are produced using different molds for injection molding, at least two kinds of molds are required, so that the cost of producing the molds accordingly increases. In particular, when the number of production of the housing cases 90B1 having the three consecutive cylindrical portions is small, the cost for producing the mold is a large burden.

Figure 7:
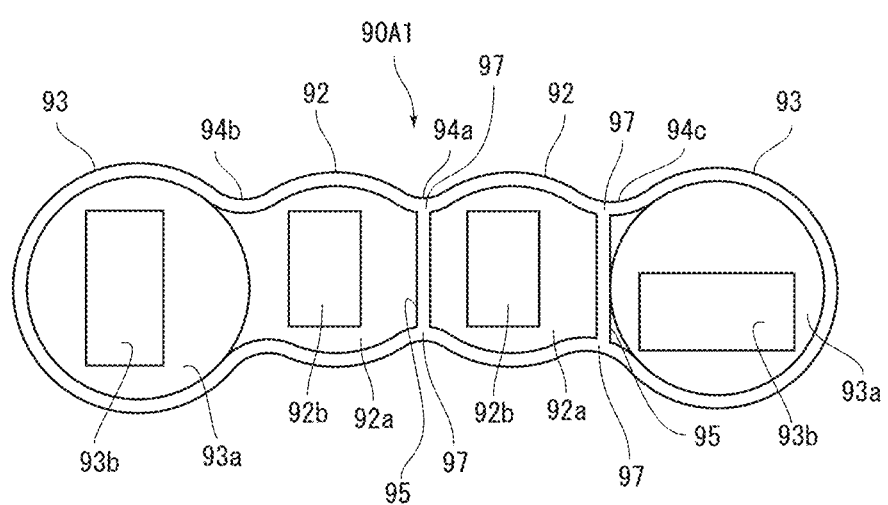
FIG. 7 is a front view illustrating a configuration of the housing case having four consecutive cylindrical portions produced using a mold, where the housing case is a part of the electric chain block illustrated in FIG. 1.
Figure 8:
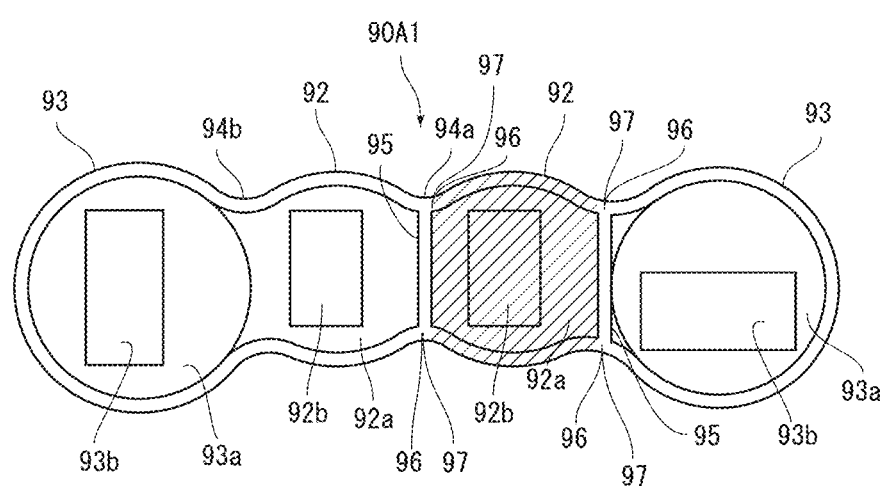
FIG. 8 is a view illustrating an image of removing one small-diameter cylindrical portion from the housing case illustrated in FIG. 7.
Figure 9:
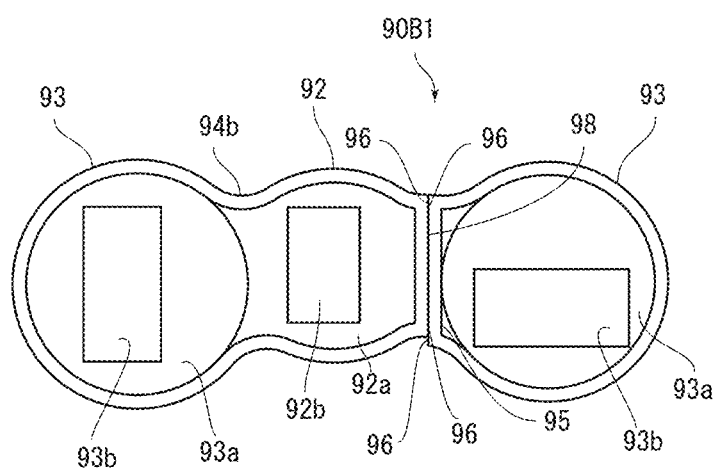
FIG. 9 is a front view illustrating a configuration of the housing case having three consecutive cylindrical portions produced by joining partition walls after removing one small-diameter cylindrical portion in FIG. 8.

Hence, the production of the housing case 90B1 is performed as follows in this embodiment. Specifically, first, the housing case 90A1 is produced as illustrated in FIG. 7. Then, the arc-shaped outer peripheral portion of a specific small-diameter cylindrical portion 92 is cut off (cut) as illustrated in FIG. 8. This makes a state in which the planar partition walls 95 are exposed to the outside. Then, the pair of partition walls 95 are joined together using, for example, an adhesive or the like. In the following explanation, such a joined portion is called a joint part 98. Through the formation of the joint part 98, the housing case 90B1 having one small-diameter cylindrical portion 92 and two large-diameter cylindrical portions 93 as illustrated in FIG. 9 is produced. In this event, the small-diameter cylindrical portion 92 is in a state of being located between the two large-diameter cylindrical portions 93. Note that a cutting region when the cutting off is performed is called a cut place 96.

Here, in the case of forming the cut place 96, the existence of a portion being a guide for cutting is preferable because the cutting off is easy to perform. In this embodiment, a cutting guide 97 being the guide for cutting is a base portion of the outer peripheral wall portion 91, where the partition wall 95 is located at the base portion.

Figure 10:
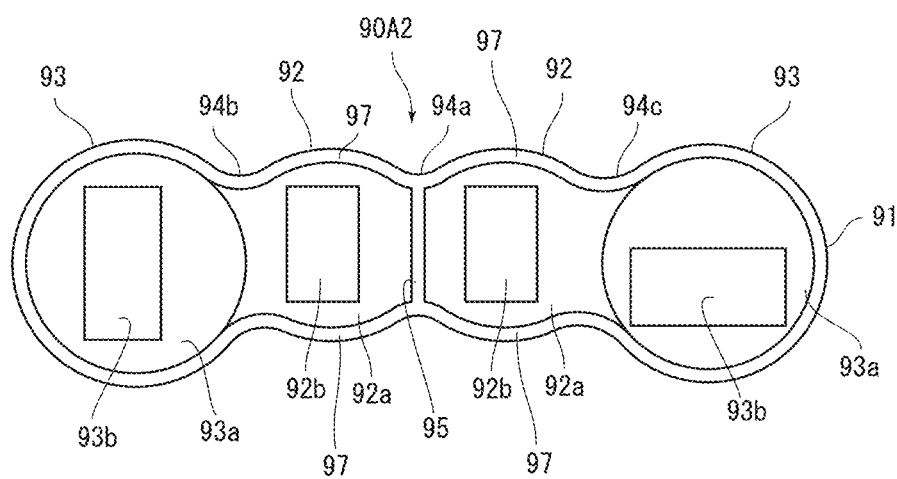
FIG. 10 is a front view illustrating a configuration of the housing case having four consecutive cylindrical portions produced using a mold according to another embodiment.

Regarding the Production of a Housing Case Having Three Consecutive Cylindrical Portions According to Another Embodiment However, the production of the three-consecutive housing case is not limited to FIG. 7 to FIG. 9. The production of a housing case 90B2 according to another embodiment will be explained based on FIG. 10 to FIG. 12. First, a housing case 90A2 having four consecutive cylindrical portions is produced as illustrated in FIG. 10. In this event, only one partition wall 95 exists in the housing case 90A2 to be produced, and the partition wall 95 exists between a pair of small-diameter cylindrical portions 92.

Figure 11:
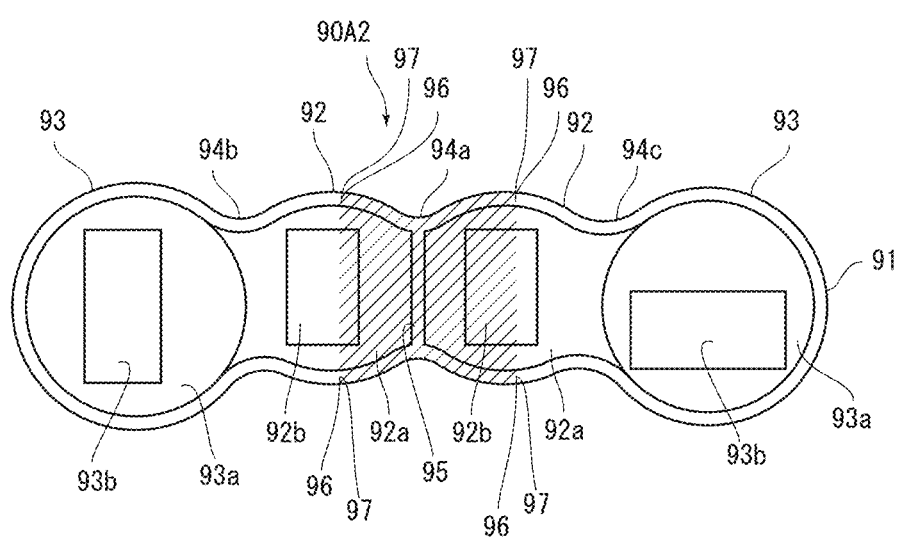
FIG. 11 is a view illustrating an image of removing one small-diameter cylindrical portion from the housing case illustrated in FIG. 10 according to another embodiment.

Next, as illustrated in FIG. 11, a region of a middle portion including the partition wall 95 of the housing case 90A2 is cut off. In this event, the housing case 90A2 is cut off at a portion where the dimension thereof in a Y-direction is largest along a Z-direction of the small-diameter cylindrical portions 92. Then, the cutting of the small-diameter cylindrical portions 92 makes a state where a pair of regions in a semi-cylindrical shape exist. Note that it is preferable that the cutting guides 97 exist also in FIG. 11, and in this case, the cutting of the outer peripheral wall portion 91 can be easily performed.

Figure 12:
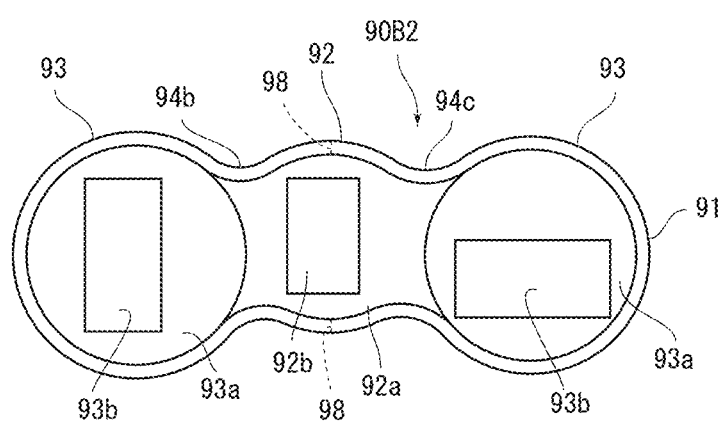
FIG. 12 is a front view illustrating a configuration of a housing case having three consecutive cylindrical portions produced by joining partition walls after removing one small-diameter cylindrical portion in FIG. 11 according to another embodiment.

Then, the cut places 96 illustrated in FIG. 11 are joined together using, for example, an adhesive. Thus, the housing case 90B2 having one small-diameter cylindrical portion 92 and two large-diameter cylindrical portions 93 is produced as illustrated in FIG. 12. Also at this time, the small-diameter cylindrical portion 92 is in a state of being located between the two large-diameter cylindrical portions 93. Note that the partition walls 95 existing in the housing case 90B1 illustrated in FIG. 9 do not exist in the housing case 90B2 as is clear from FIG. 12. Therefore, the dimension of the storage case 90B1 in the Z-direction is reduces. Further, the housing case 90B2 is configured to be easily bent along the outer peripheral surface of the motor housing 22.

Regarding Effects

In the electric chain block 10 in the above configuration, the motor housing 22 in a cylindrical shape is provided on the outer peripheral side of the motor 21 driven by the single-phase alternating-current power and including the main winding and the auxiliary winding. Further, the control unit 50 is also provided which controls the operation of the motor 21 and is covered with the rectangular control housing 51. Further, the starting capacitor 71, the operating capacitor 72, and the disconnecting switch 80 are provided and they are accommodated in the housing case 90A1, 90A2, 90B1, 90B2. In this case, the starting capacitor 71 is accommodated in the small-diameter cylindrical portion 92 (a first cylindrical portion), the operating capacitor 72 is accommodated in the large-diameter cylindrical portion 93 (a second cylindrical portion), and the disconnecting switch 80 is accommodated in the large-diameter cylindrical portion 93 (a third cylindrical portion).

Further, in the housing case 90A1, 90A2, 90B1, 90B2, the small-diameter cylindrical portion 92 and the large-diameter cylindrical portion 93 are integrally provided in a state where they continue in a horizontal row. Further, the housing case 90A1, 90A2 is attached to the outer periphery of the motor housing 22 in a manner that the cylinders of the cylindrical portions are oriented parallel with the rotation axis of the motor 21.

Therefore, the starting capacitor 71 and the operating capacitor 72 are attached to the outer periphery side of the motor housing 22 in a cylindrical shape. Accordingly, it becomes possible to prevent the electric chain block 10 from becoming large in size in the case where the starting capacitor 71 and the operating capacitor 72 are attached to the electric chain block 10, as compared with the case where the starting capacitor 71 and the operating capacitor 72 cannot be attached to the motor housing 22. Therefore, the electric chain block 10 can be made in the same size as that of the configuration of not using the starting capacitor 71, the operating capacitor 72, and the disconnecting switch 80 as in the recent three-phase induction motor, so that the storing and housing boxes for them can be made common.

Note that the housing case 90A1, 90A2 can be attached also in a state of not protruding to a direction separating from the drive shaft 23 (a rotation shaft) farther than the first outer wall surface 52 of the control housing 51 as illustrated in FIG. 4. In this case, it becomes possible to further prevent the electric chain block 10 from becoming large in size.

Further, in the case of attaching the starting capacitor 71, the operating capacitor 72, and the disconnecting switch 80 to the electric chain block 10, the housing case 90A1, 90A2, 90B1, 90B2 is used. Therefore, the starting capacitor 71, the operating capacitor 72, and the disconnecting switch 80 can be collectively attached to the electric chain block 10. Accordingly, it is not necessary to increase the man-hours for attachment as compared with the case of individually attaching the starting capacitor 71, the operating capacitor 72, and the disconnecting switch 80.

Further, in this embodiment, the small-diameter cylindrical portion 92 (the first cylindrical portion) is provided to be smaller in diameter than the large-diameter cylindrical portion 93 (the second cylindrical portion). In addition, the small-diameter cylindrical portion 92 (the first cylindrical portion) is provided between the two large-diameter cylindrical portions 93 (the second cylindrical portion and the third cylindrical portion).

Therefore, in the housing case 90A1, 90A2, 90B1, 90B2, the large-diameter cylindrical portion 93 is located at least one end side of the arrangement of the cylindrical portions arranged side by side in a horizontal row. Accordingly, the housing case 90A1, 90A2, 90B1, 90B2 can be easily made to follow the outer periphery of the motor housing 22 in a cylindrical shape, and in this event, it is possible to prevent the small-diameter cylindrical portion 92 from protruding to the one side (the Y1 side) in the width direction (the Y-direction).

Further, in this embodiment, the large-diameter cylindrical portions 93 (the second cylindrical portion and the third cylindrical portion) protrude in the direction (the direction toward Y2) separating from the first outer wall surface 52 of the control housing 51 farther than the small-diameter cylindrical portions 92 (the first cylindrical portion) to thereby prevent the protrusion of the large-diameter cylindrical portions 93 (the second cylindrical portion and the third cylindrical portion) on the first outer wall surface 52 side (the Y1 side). Accordingly, as illustrated in FIG. 4, it is possible to make the large-diameter cylindrical portions 93 for accommodating the larger-diameter operating capacitor 72 and the disconnecting switch 80 protrude to the other side (the Y2 side) in the width direction (the Y-direction) farther than the small-diameter cylindrical portions 92. This can configure the large-diameter cylindrical portions 93 not to protrude to the one side (the Y2 side) in the width direction (the Y-direction) farther than the small-diameter cylindrical portions 92, thereby preventing the electric chain block 10 from becoming large in size.

Further, one or two starting capacitors 71 are provided in this embodiment. Then, when only one starting capacitor 71 is provided, only one small-diameter cylindrical portion 92 is provided in the housing case 90A1, 90A2, 90B1, 90B2. Along with this, at a certain region of the outer peripheral wall portion 91 constituting the small-diameter cylindrical portion 92, the joint part 98 made by joining after cutting is provided to remove one small-diameter cylindrical portion 92 from the housing case 90A1, 90A2 having two small-diameter cylindrical portions 92.

Therefore, it becomes unnecessary to produce the housing case 90A1, 90A2 having four consecutive cylindrical portions and the housing case 90B1, 90B2 having three consecutive cylindrical portions by using respective different molds for injection molding. In other words, since the housing case 90B1, 90B2 having three consecutive cylindrical portions is produced using the housing case 90A1, 90A2 having four consecutive cylindrical portions, the mold for producing the housing case 90B1, 90B2 having three consecutive cylindrical portions becomes unnecessary. Therefore, the cost for producing the mold can be reduced.

Further, the housing case 90A1, 90A2 is provided with a pair of cutting guides 97 at a distance corresponding to the removal of the two small-diameter cylindrical portions 92 in this embodiment. In the case where two starting capacitors 71 are provided, the starting capacitors 71 are accommodated in the two small-diameter cylindrical portions 92 respectively in a state of not cutting at the cutting guides 97. Further, in the case where only one starting capacitor 71 is provided, only one starting capacitor 71 is accommodated in only one small-diameter cylindrical portion 92 in a state where the joint part 98 is formed after the cutting along the cutting guides 97.

Therefore, in the case of producing the housing case 90B1, 90B2 having three consecutive cylindrical portions, the housing case 90A1, 90A2 is easily cut along the cutting guides 97.

Modification Example

Though the embodiments of the present invention have been explained in the above, the present invention can be modified in various forms in addition to the above. Hereinafter, they will be explained.

In the above embodiments, the housing case 90A1, 90A2, 90B1, 90B2 is formed of elastomer. However, the material of the housing case 90A1, 90A2, 90B1, 90B2 is not limited to elastomer. For example, the housing case 90A1, 90A2, 90B1, 90B2 may be formed using various resins, wood, ceramics, metal, fiber-based material such as paper or the like.

Besides, in the above embodiments, the capacitor accommodating part 60 is provided on the one side (the Y1 side) in the width direction (the Y-direction) with respect to the motor housing 22, and the housing case 90A1, 90A2, 90B1, 90B2 is accommodated in the capacitor accommodating part 60. However, a configuration may be employed in which the capacitor accommodating part 60 is provided on the one side (the Z1 side) or the other end side (the Z2 side) in the vertical direction (the Z-direction) with respect to the motor housing 22. In particular, on the other end side (the Z2 side) in the vertical direction (the Z-direction), a not-illustrated hook is located. Accordingly, even when the configuration in which the capacitor accommodating part 60 is provided on the other end side (the Z2 side) in the vertical direction (the Z-direction) with respect to the motor housing 22 is employed, the increase in size can be prevented.

Further, in the above embodiments, the width direction is the Y-direction perpendicular to the axial direction of the drive shaft 23 (the rotation shaft) of the motor 21 as illustrated in FIG. 1 to FIG. 4 and so on. However, the width direction may be the Z-direction. Besides, the width direction may be an arbitrary direction within a YZ plane. Besides, the first outer wall surface 52 of the control housing 51 may be a planar shape or may be a curved shape.

Further, in the above embodiments, the housing case 90A1, 90A2, 90B1, 90B2 is attached to the outer periphery of the motor housing 22 so that cylinder orientation of the cylindrical portions are oriented parallel with the drive shaft 23 (the rotation shaft) of the motor 21. However, the attachment may be performed so that the cylinder orientation of the cylindrical portions are oriented while including a slight error with respect to the state of being parallel with the drive shaft 23 (the rotation shaft) of the motor 21. Further, the cylinder orientation of the cylindrical portions may slightly vary in angle from the state of being parallel with the drive shaft 23 (the rotation shaft) of the motor 21.

The invention claimed is:
1. An electric hoisting machine comprising:
   a motor provided at a main body of the electric hoisting machine, the motor being driven by single-phase current, and comprising a main winding and an auxiliary winding;
   a motor housing provided in a cylindrical shape on an outer peripheral side of the motor;
   a starting capacitor electrically connected in series with the auxiliary winding of the motor;
   an operating capacitor electrically connected in series with the auxiliary winding of the motor, and electrically connected in parallel with the starting capacitor;
   a starting capacitor disconnecting switch for disconnecting the electrical connection between the auxiliary winding and the starting capacitor or the electrical connection between the starting capacitor and the single-phase current, after start of the motor;
   a control unit controlling an operation of the motor and covered with a control housing; and
   a housing case in which a first cylindrical portion for accommodating the starting capacitor, a second cylindrical portion for accommodating the operating capacitor, and a third cylindrical portion for accommodating the starting capacitor disconnecting switch are integrally provided in a horizontal row, the housing case being attached to an outer periphery of the motor housing in a manner that the cylindrical portions are oriented parallel with a rotation axis.
2. The electric hoisting machine according to claim 1, wherein the first cylindrical portion is provided to be smaller in diameter than the second cylindrical portion, and the first cylindrical portion is provided between the second cylindrical portion and the third cylindrical portion.

3. The electric hoisting machine according to claim 2, wherein the second cylindrical portion and the third cylindrical portion protrude in a direction separating from the first outer wall surface of the control housing farther than the first cylindrical portion to prevent protrusion of the second cylindrical portion and the third cylindrical portion on the first outer wall surface side.

4. The electric hoisting machine according to claim 3, wherein:
one or two starting capacitors are provided; and
when only one starting capacitor is provided, only one first cylindrical portion is provided, and at any region of an outer peripheral wall portion constituting the first cylindrical portion, a joint part made by joining after cutting to remove one first cylindrical portion from the housing case having two first cylindrical portions is provided.

5. The electric hoisting machine according to claim 4, wherein:
the housing case is provided with a pair of cutting guides separated from each other at a distance corresponding to removal of the two first cylindrical portions;
when the two starting capacitors are provided, the starting capacitors are accommodated in the two first cylindrical portions respectively in a state of not cutting at the cutting guides; and
when the only one starting capacitor is provided, the only one starting capacitor is accommodated in the only one first cylindrical portion in a state where the joint part is formed after the cutting along the cutting guides.

6. The electric hoisting machine according to claim 2, wherein:
one or two starting capacitors are provided; and
when only one starting capacitor is provided, only one first cylindrical portion is provided, and at any region of an outer peripheral wall portion constituting the first cylindrical portion, a joint part made by joining after cutting to remove one first cylindrical portion from the housing case having two first cylindrical portions is provided.

7. The electric hoisting machine according to claim 6, wherein:
the housing case is provided with a pair of cutting guides separated from each other at a distance corresponding to removal of the two first cylindrical portions;
when the two starting capacitors are provided, the starting capacitors are accommodated in the two first cylindrical portions respectively in a state of not cutting at the cutting guides; and
when the only one starting capacitor is provided, the only one starting capacitor is accommodated in the only one first cylindrical portion in a state where the joint part is formed after the cutting along the cutting guides.

* * * * *